(12) United States Patent
Suyama et al.

(10) Patent No.: US 10,183,567 B2
(45) Date of Patent: Jan. 22, 2019

(54) VEHICLE DRIVE DEVICE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Daiki Suyama, Okazaki (JP); Katsuhiko Hattori, Nagoya (JP); Yukihiko Ideshio, Nissin (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 169 days.

(21) Appl. No.: 15/126,177

(22) PCT Filed: Mar. 30, 2015

(86) PCT No.: PCT/JP2015/059858
§ 371 (c)(1),
(2) Date: Sep. 14, 2016

(87) PCT Pub. No.: WO2015/152126
PCT Pub. Date: Oct. 8, 2015

(65) Prior Publication Data
US 2017/0080793 A1 Mar. 23, 2017

(30) Foreign Application Priority Data

Apr. 1, 2014 (JP) .................................. 2014-075554

(51) Int. Cl.
*F16H 57/04* (2010.01)
*B60K 6/26* (2007.10)
(Continued)

(52) U.S. Cl.
CPC ................ *B60K 6/387* (2013.01); *B60K 6/26* (2013.01); *B60K 6/36* (2013.01); *B60K 6/40* (2013.01);
(Continued)

(58) Field of Classification Search
CPC .... F16H 57/04; F16H 57/0434; F16H 57/045; B60K 6/26
(Continued)

(56) References Cited

U.S. PATENT DOCUMENTS 9,327,590 B2 * 5/2016 Ideshio .................... B60K 6/44
2011/0001400 A1 1/2011 Chiba et al.
(Continued)

FOREIGN PATENT DOCUMENTS

JP H09-79118 A 3/1997
JP 2009-071905 A 4/2009
(Continued)

OTHER PUBLICATIONS

Jun. 16, 2015 Search Report issued in International Patent Application No. PCT/JP2015/059858.

*Primary Examiner* — Ha Dinh Ho
(74) *Attorney, Agent, or Firm* — Oliff PLC

(57) ABSTRACT

A vehicle drive device, wherein the fluid coupling accommodating space is formed between the rotating electrical machine accommodating space and the speed change mechanism accommodating space in an axial direction of the speed change mechanism and is configured such that no oil is supplied to a region around the fluid coupling, the discharge oil passage has an introducing opening that opens to the second oil reservoir, and a lowest end of the introducing opening is located below a lowest end of the rotating electrical machine.

2 Claims, 5 Drawing Sheets

(51) Int. Cl.

| | |
|---|---|
| *B60K 6/387* | (2007.10) |
| *B60K 6/36* | (2007.10) |
| *B60K 6/40* | (2007.10) |
| *B60K 6/405* | (2007.10) |
| *B60K 6/48* | (2007.10) |
| *B60K 6/54* | (2007.10) |
| *B60L 11/14* | (2006.01) |
| *F16D 13/52* | (2006.01) |
| *F16D 48/02* | (2006.01) |
| *F16D 25/0638* | (2006.01) |
| *F16D 25/12* | (2006.01) |
| *B60K 6/24* | (2007.10) |
| *F16H 45/02* | (2006.01) |

(52) U.S. Cl.
CPC ........... *B60K 6/405* (2013.01); *B60K 6/48* (2013.01); *B60K 6/54* (2013.01); *B60L 11/14* (2013.01); *F16D 13/52* (2013.01); *F16D 25/14* (2013.01); *F16H 57/04* (2013.01); *F16H 57/042* (2013.01); *F16H 57/0434* (2013.01); *F16H 57/0436* (2013.01); *F16H 57/0452* (2013.01); *B60K 6/24* (2013.01); *B60K 2006/4825* (2013.01); *B60Y 2200/92* (2013.01); *F16D 25/0638* (2013.01); *F16D 25/123* (2013.01); *F16D 2300/0214* (2013.01); *F16H 45/02* (2013.01); *Y10S 903/914* (2013.01)

(58) Field of Classification Search
USPC .......................................................... 74/661
See application file for complete search history.

(56) References Cited

U.S. PATENT DOCUMENTS

| | | | |
|---|---|---|---|
| 2013/0111891 A1* | 5/2013 | Iwase | F16D 33/02 60/347 |
| 2014/0231174 A1 | 8/2014 | Iwase et al. | |
| 2015/0027273 A1* | 1/2015 | Iwase | H02K 5/225 74/665 B |

FOREIGN PATENT DOCUMENTS

| | | |
|---|---|---|
| JP | 2011-105195 A | 6/2011 |
| JP | 2011-126320 A | 6/2011 |
| JP | 2013-095389 A | 5/2013 |
| JP | 2013-095390 A | 5/2013 |

\* cited by examiner

VEHICLE DRIVE DEVICE

BACKGROUND

The present disclosure relates to vehicle drive devices including: a rotating electrical machine; a speed change mechanism disposed in a power transmission path connecting the rotating electrical machine and wheels; a fluid coupling that drivingly couples the rotating electrical machine to the speed change mechanism; and a case forming, as spaces that are independent of each other, a rotating electrical machine accommodating space accommodating the rotating electrical machine, a speed change mechanism accommodating space accommodating the speed change mechanism, and a fluid coupling accommodating space accommodating the fluid coupling.

Related art of such vehicle drive devices includes, e.g., a technique described in Japanese Patent Application Publication No. 2011-105195. In the description of this section, the names of relevant members in Japanese Patent Application Publication No. 2011-105195 are cited in parentheses "[ ]." In the configuration described in Japanese Patent Application Publication No. 2011-105195, an oil reservoir portion [oil reservoir portion 101] that stores oil to be supplied to a rotating electrical machine [electric motor 1] is formed in the lower part of the space in a case accommodating the rotating electrical machine. In this configuration, as described in paragraph [0045] and FIG. 2 of Japanese Patent Application Publication No. 2011-105195, oil in the oil reservoir portion is scooped up by rotation of a rotor [rotor 13] to cool the rotating electrical machine. In the configuration of Japanese Patent Application Publication No. 2011-105195, since oil scooped up by rotation of the motor is supplied to the rotating electrical machine, rotation resistance of the rotor tends to increase, which reduces energy efficiency of the device accordingly.

The vehicle drive devices typically include an oil reservoir portion that stores oil to be supplied to the speed change mechanism. Accordingly, in one possible configuration, oil in the oil reservoir portion is supplied to the rotating electrical machine. An example of such a configuration is a technique described in Japanese Patent Application Publication No. 2013-095389. In the configuration described in Japanese Patent Application Publication No. 2013-095389, oil in a first oil reservoir portion U1 communicating with a speed change mechanism accommodating space is supplied to a rotating electrical machine MG. The oil supplied to the rotating electrical machine MG is collected by a second oil reservoir portion U2 communicating with a rotating electrical machine accommodating space SG. The collected oil is supplied to the first oil reservoir portion U1 via a discharge oil passage AD. As shown in FIGS. 3, 5, etc. of Japanese Patent Application Publication No. 2013-095389, the discharge oil passage AD includes a first discharge oil passage AF extending in the horizontal direction from a first opening ADo that opens toward the first oil reservoir portion U1, and a second discharge oil passage AE extending in a downward direction (tilted downward at about 45 degrees) with respect to the horizontal direction from a second opening AEo that opens into the second oil reservoir portion U2 and communicating with the first discharge oil passage AF.

SUMMARY

In the configuration described in Japanese Patent Application Publication No. 2013-095389, however, the second opening AEo of the second discharge oil passage AE opens at a position above the lowermost end of the rotating electrical machine MG. Oil that is present above the second opening AEo in the second oil reservoir portion U2 is therefore introduced into the discharge oil passage AE and supplied to the first oil reservoir portion U1, but oil that is present below the second opening AEo in the second oil reservoir portion U2 is less likely to flow into the discharge oil passage AE and may stay in the second oil reservoir portion U2. If relatively hot oil that has been used to cool the rotating electrical machine MG stays in the second oil reservoir portion U2, efficiency of cooling the rotating electrical machine MG partially soaked in the oil in the second oil reservoir portion U2 may be reduced.

It is therefore desired to implement a vehicle drive device that can reduce rotation resistance of a rotor and can efficiently cool a rotating electrical machine.

In view of the above, a vehicle drive device according to an exemplary aspect includes a rotating electrical machine; a speed change mechanism disposed in a power transmission path connecting the rotating electrical machine and wheels; a fluid coupling that drivingly couples the rotating electrical machine to the speed change mechanism; a case forming, as spaces that are independent of each other, a rotating electrical machine accommodating space accommodating the rotating electrical machine, a speed change mechanism accommodating space accommodating the speed change mechanism, and a fluid coupling accommodating space accommodating the fluid coupling; a first oil reservoir that communicates with the speed change mechanism accommodating space and that can store oil; a hydraulic pump that supplies the oil in the first oil reservoir to the rotating electrical machine and the speed change mechanism; a second oil reservoir that is located in the rotating electrical machine accommodating space and that can store oil; and a discharge oil passage that discharges the oil in the second oil reservoir to the first oil reservoir, wherein the fluid coupling accommodating space is formed between the rotating electrical machine accommodating space and the speed change mechanism accommodating space in an axial direction of the speed change mechanism and is configured such that no oil is supplied to a region around the fluid coupling, the discharge oil passage has an introducing opening that opens to the second oil reservoir, and a lowest end of the introducing opening is located below a lowest end of the rotating electrical machine.

According to the above configuration, oil is supplied to the rotating electrical machine accommodating space and the speed change mechanism accommodating space, and no oil is supplied to the region around the fluid coupling in the fluid coupling accommodating space formed between the rotating electrical machine accommodating space and the speed change mechanism accommodating space in the axial direction. According to this configuration, even if the spaces to which oil is supplied are thus separated from each other in the axial direction by the space to which no oil is supplied, oil in the first oil reservoir can be supplied to the rotating electrical machine by the hydraulic pump. Oil can thus be appropriately supplied to the rotating electrical machine, and rotation resistance of the rotor can be reduced as compared to the case where oil is scooped up by rotation of the rotor and supplied to the rotating electrical machine. The vehicle drive device includes the second oil reservoir located in the rotating electrical machine accommodating space and the discharge oil passage that discharges oil in the second oil reservoir to the first oil reservoir. Accordingly, oil supplied to the rotating electrical machine can be collected in the second oil reservoir, and the oil collected in the second oil reservoir can be supplied to the first oil reservoir via the discharge oil passage. That is, an oil flow path is formed through which oil supplied to the rotating electrical machine by the hydraulic pump is collected in the first oil reservoir from which oil is sucked by the hydraulic pump.

According to the above configuration, the lowest end of the introducing opening of the discharge oil passage which opens to the second oil reservoir is located below the lowest end of the rotating electrical machine. Accordingly, oil dropping from above and stored in the second oil reservoir can be introduced into the discharge oil passage through the introducing opening located at a lower position. This restrains a part of the oil from staying in the second oil reservoir, and oil can be appropriately circulated. This can restrain reduction in efficiency of cooling the rotating electrical machine due to oil staying in the second oil reservoir.

DETAILED DESCRIPTION OF EMBODIMENTS

Figure 1:
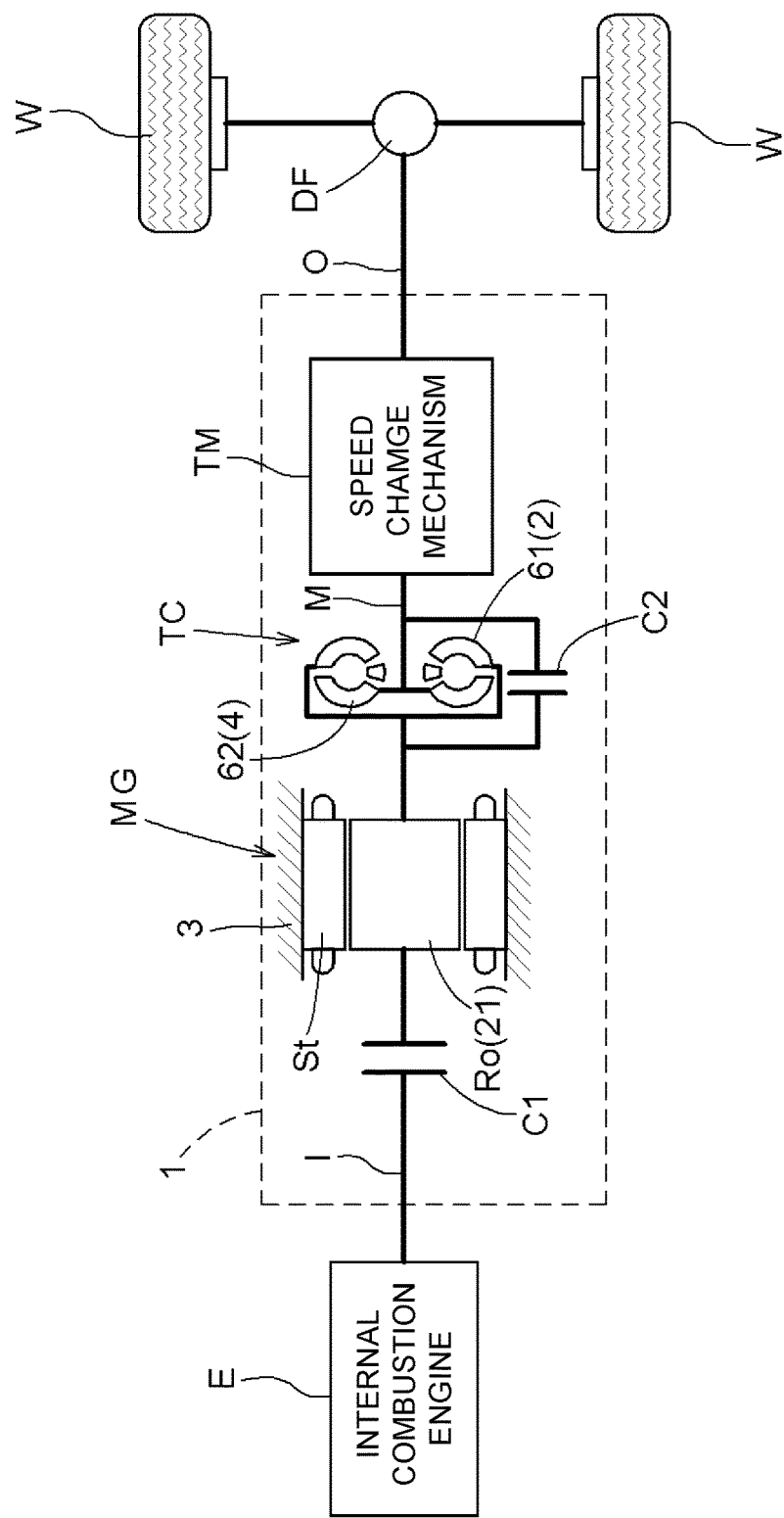
FIG. 1 is a schematic view showing the general configuration of a vehicle drive device according to an embodiment.

An embodiment of a vehicle drive device will be described with reference to the accompanying drawings. In the following description, the "axial direction L," the "radial direction R," and the "circumferential direction" are defined based on the axis (axis X shown in FIG. 2) of an input shaft of a speed change mechanism TM (a shift input shaft; in this example, an intermediate shaft M) unless otherwise specified. In the present embodiment, since all of a rotating electrical machine MG, a first clutch C1, and a torque converter TC are arranged coaxially with the speed change mechanism TM, the "axial direction," the "radial direction," and the "circumferential direction" of each of the rotating electrical machine MG, the first clutch C1, and the torque converter TC are the same as the "axial direction L," the "radial direction R," and the "circumferential direction" of the speed change mechanism TM, respectively. The "first side L1 in the axial direction" represents the side from an output shaft of the speed change mechanism TM (a shift output shaft; in this example, an output shaft O) toward the shift input shaft in the axial direction L (left side in FIG. 2), and the "second side L2 in the axial direction" represents the opposite side from the first side L1 in the axial direction (right side in FIG. 2). The "radially inner side R1" represents the inner side in the radial direction R, and the "radially outer side R2" represents the outer side in the radial direction R.

In the following description, the terms "above" or "upper" and "below" or "lower" are defined based on the vertical direction V (see FIG. 2) in the state where the vehicle drive device 1 is mounted on a vehicle (vehicle mounted state). The term "above" or "upper" represents upward in FIG. 2, and the term "below" or "lower" represents downward in FIG. 2. The direction of each member refers to the direction of that member in a vehicle drive device 1 in an assembled state. The terms regarding the direction, position, etc. of each member are used as a concept including a difference due to an error that may be tolerated in manufacturing.

As used herein, the expression "drivingly coupled" refers to the state where two rotary elements are coupled together such that they can transmit a driving force therebetween, and is used as a concept including the state where the two rotary elements are coupled together so as to rotate together, or the state where the two rotary elements are coupled together such that they can transmit a driving force therebetween via one or more transmission members. Such transmission members include various members that transmit rotation at the same speed or a shifted speed and include, e.g., a shaft, a gear mechanism, a belt, a chain, etc. Such transmission members may include an engagement device that selectively transmits rotation and a driving force, such as, e.g., a friction engagement device and a meshing engagement device.

As used herein, the term "rotating electrical machine" is used as a concept including all of a motor (electric motor), a generator (electric generator), and a motor-generator that functions as both a motor and a generator as necessary.

1. General Configuration of Vehicle Drive Device

FIG. 1 is a schematic view showing the general configuration of the vehicle drive device 1 according to the present embodiment. As shown in FIG. 1, the vehicle drive device 1 includes an input shaft I (input member or input) that is drivingly coupled to an internal combustion engine E, a rotating electrical machine MG, a torque converter TC, a speed change mechanism TM, an output shaft O drivingly coupled to the speed change mechanism TM and wheels W, and a case 3. The torque converter TC (fluid coupling) includes a coupling input-side member 2 that is drivingly coupled to the rotating electrical machine MG, and a coupling output-side member 4 that makes a pair with the coupling input-side member 2. The speed change mechanism TM is drivingly coupled to the coupling output-side member 4 via an intermediate shaft M. That is, in the present embodiment, the speed change mechanism TM is drivingly coupled to the rotating electrical machine MG via the torque converter TC. The vehicle drive device 1 further includes a first clutch C1 (friction engagement device) that can change the engagement state between the input shaft I and the coupling input-side member 2. In the present embodiment, the rotating electrical machine MG is drivingly coupled to the speed change mechanism TM via the torque converter TC, and the first clutch C1 changes the engagement state between the input shaft I and the coupling input-side member 2 to change the engagement state between the input shaft I and the speed change mechanism TM. As shown in FIG. 1, the first clutch C1, the rotating electrical machine MG, the torque converter TC, and the speed change mechanism TM are sequentially arranged in a power transmission path between the input shaft I and the output shaft O in this order from the input shaft I side.

The internal combustion engine E is a motor that is driven by fuel combustion in the engine to output power. For example, the internal combustion engine E may be a gasoline engine, a diesel engine, etc. In the present embodiment, the input shaft I is drivingly coupled to an output shaft (crankshaft etc.) of the internal combustion engine E via a damper 16 (see FIG. 2, not shown in FIG. 1). The input shaft I may be drivingly coupled to the output shaft of the internal combustion engine E without interposing the damper 16 therebetween. The input shaft I may be formed integrally with one of the two members to which the input shaft I is drivingly coupled (e.g., the output shaft of the internal combustion engine E), or may be a separate member from both of the two members.

The first clutch C1 is disposed between the input shaft I and the rotating electrical machine MG (rotor member 21) in the power transmission path, and functions as an internal combustion engine separating clutch that separates the internal combustion engine E from the wheels W. The speed change mechanism TM is disposed in the power transmission path connecting the rotating electrical machine MG and the wheels W. In this example, the speed change mechanism TM is disposed between the torque converter TC and the output shaft O in the power transmission path. The speed change mechanism TM is formed by a mechanism that can change the speed ratio in a stepped or stepless manner (e.g., an automatic stepped speed change mechanism etc.), and shifts the rotational speed of the intermediate shaft M (shift input shaft) drivingly coupled to the coupling output-side member 4 at a predetermined speed ratio to transmit the shifted rotational speed to the output shaft O (shift output shaft) drivingly coupled to an output differential gear unit DF.

The output shaft O is drivingly coupled to the wheels W via the output differential gear unit DF, and rotation and torque transmitted to the output shaft O are distributed and transmitted to the two wheels W, namely the right and left wheels W, via the output differential gear unit DF. The vehicle drive device 1 can thus transmit the torque of one or both of the internal combustion engine E and the rotating electrical machine MG to the wheels W to move the vehicle. That is, the vehicle drive device 1 is configured as a drive device for hybrid vehicles, and specifically is configured as a one-motor parallel hybrid drive device. The output shaft O may be formed integrally with one of the two members to which the output shaft O is drivingly coupled (e.g., a driveshaft etc.), or may be a separate member from both of the two members.

In the present embodiment, the input shaft I, the first clutch C1, the rotating electrical machine MG, the torque converter TC, the intermediate shaft M, the speed change mechanism TM, and the output shaft O are arranged on the axis X (see FIG. 2), and the vehicle drive device 1 according to the present embodiment has a single axis configuration that is suitable for being mounted on front engine rear drive (FR) vehicles.

2. Configuration of Each Part of Drive Device

Figure 2:
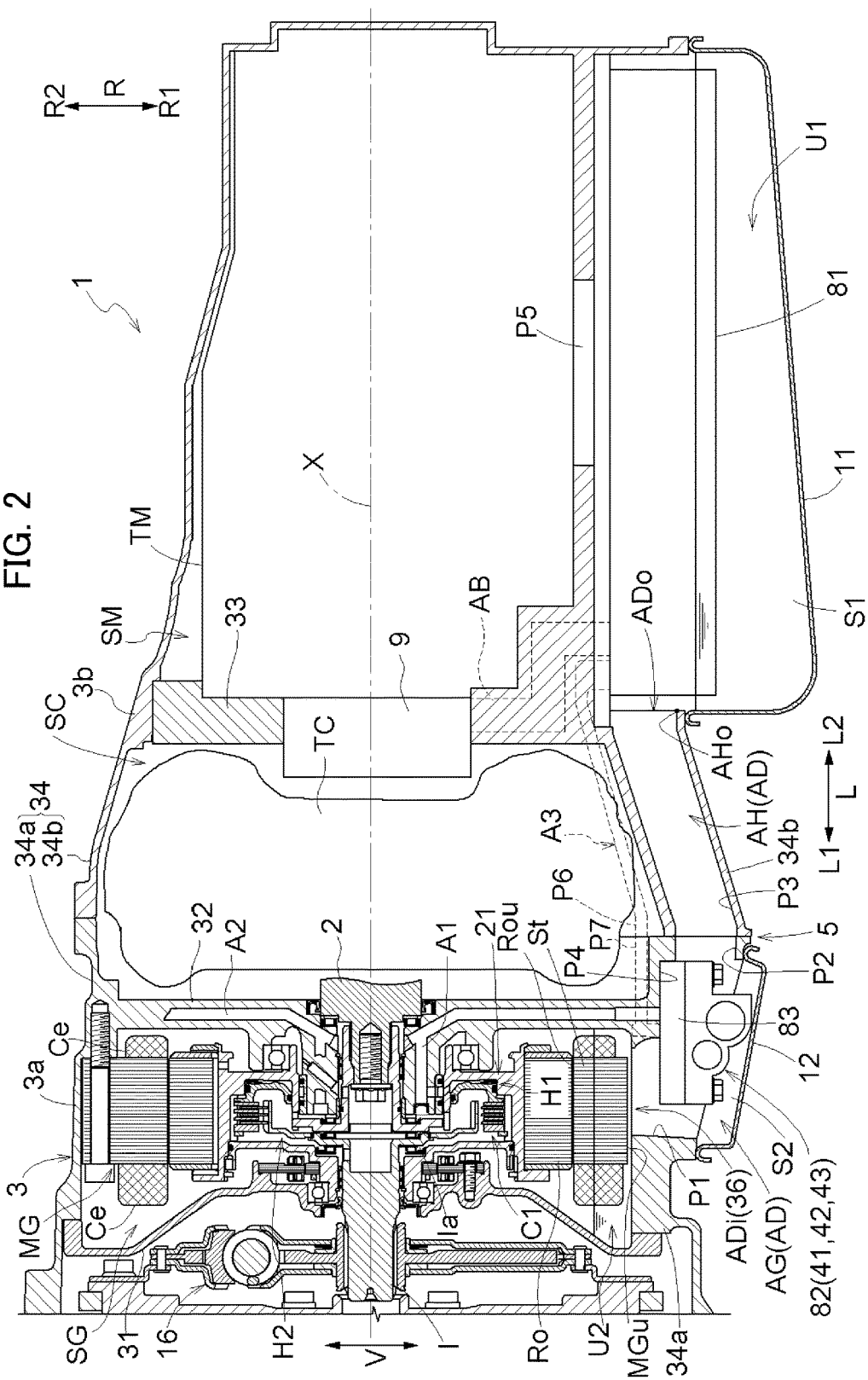
FIG. 2 is a partial sectional view of the vehicle drive device according to the embodiment.
Figure 3:
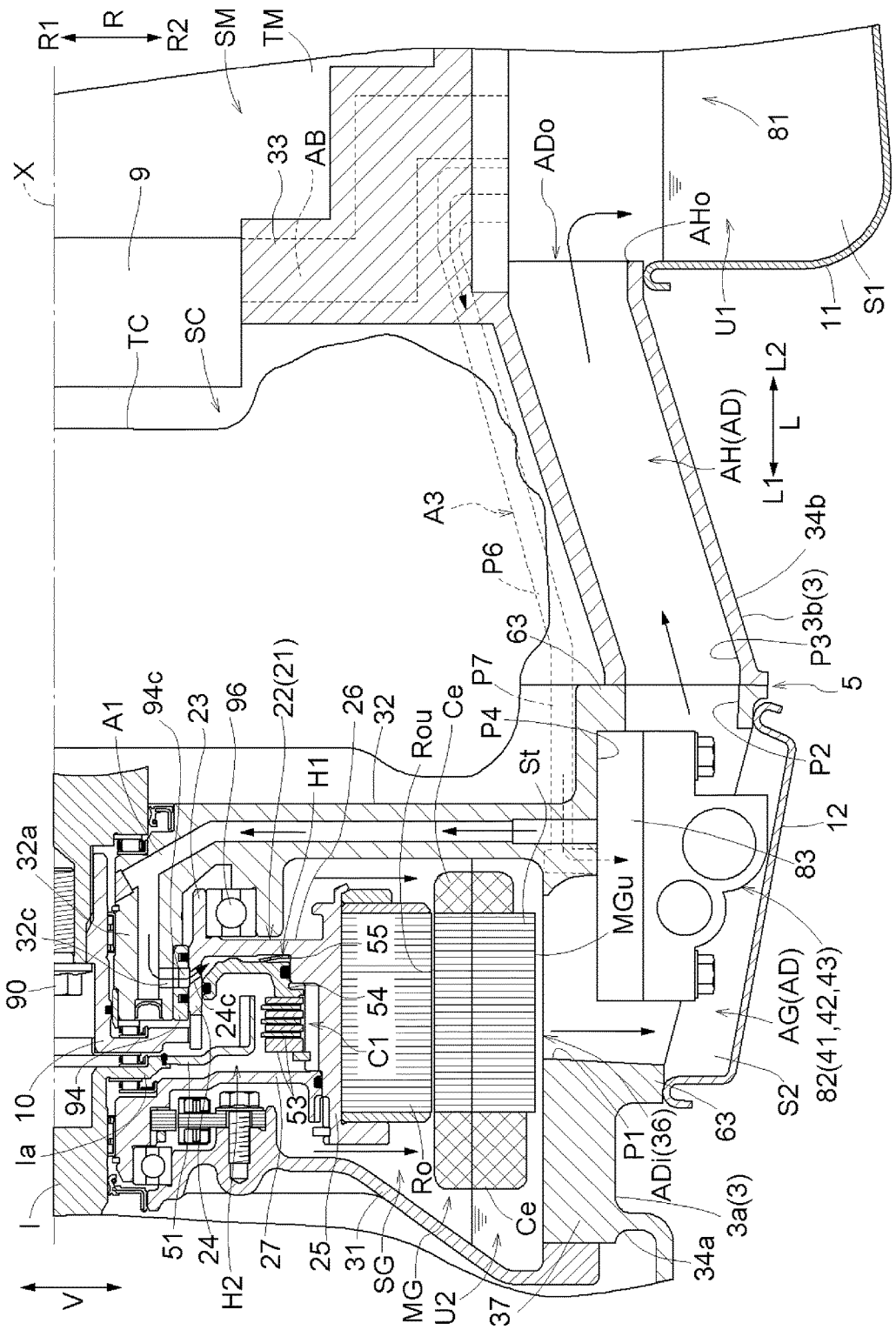
FIG. 3 is a partial enlarged view of FIG. 2.
Figure 4:
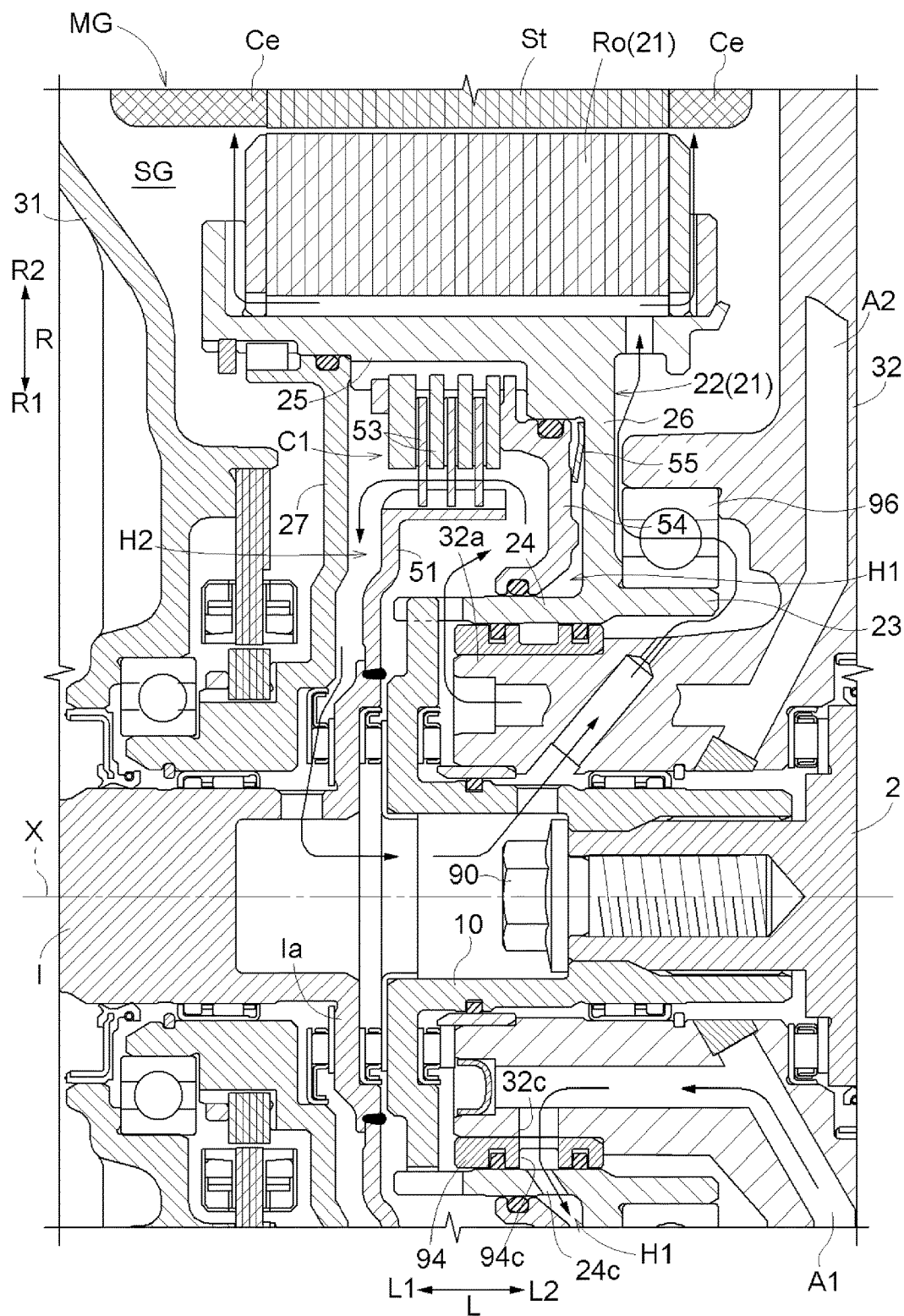
FIG. 4 is a partial sectional view of the vehicle drive device according to the embodiment at a position different from FIG. 2.

The configuration of each part of the vehicle drive device 1 according to the present embodiment will be described below with reference to FIGS. 2 to 4. FIG. 2 is a partial sectional view of the vehicle drive device 1 according to the present embodiment taken along a vertical plane including the axis X, and FIGS. 3 and 4 are partial enlarged views of FIG. 2. Specific configurations of the torque converter TC and the speed change mechanism TM are not shown in FIGS. 2 and 3.

2-1. Rotating Electrical Machine

As shown in FIG. 2, the rotating electrical machine MG includes a stator St and the rotor member 21. The stator St is fixed to the case 3 and includes coil end portions Ce on both sides in the axial direction L. As shown in FIG. 3, the rotor member 21 includes a rotor Ro placed so as to face the stator St, and a rotor support member 22 supporting the rotor Ro such that the rotor Ro can rotate relative to the case 3. In the present embodiment, the rotor Ro is placed on the radially inner side R1 of the stator St, and the rotor support member 22 is formed so as to extend toward the radially inner side R1 from the rotor Ro and supports the rotor Ro from the radially inner side R1.

As shown in FIGS. 3 and 4, in the present embodiment, the rotor support member 22 includes a rotor holding portion 25 holding the rotor Ro, and a radially extending portion 26. The rotor holding portion 25 is formed in a cylindrical shape having an outer peripheral portion that contacts the inner peripheral surface of the rotor Ro and a flange portion that contacts a side surface in the axial direction L of the rotor Ro. The radially extending portion 26 is formed in the shape of an annular disc extending toward the radially inner side R1 from a part of the rotor holding portion 25 which is located on the second side L2 in the axial direction with respect to the central part in the axial direction L of the rotor holding portion 25. The radially extending portion 26 includes at its end on the radially inner side R1 a first axially projecting portion 23 that is a tubular projecting portion projecting toward the second side L2 in the axial direction, and a second axially projecting portion 24 that is a tubular projecting portion projecting toward the first side L1 in the axial direction. The first axially projecting portion 23 is a supported portion that is supported in the radial direction R by a bearing 96 such that the supported portion can rotate with respect to the case 3 (specifically, a second support wall 32 described below). The second axially projecting portion 24 forms a connection portion with a coupling member 10 described below.

A plate-like member 27 having the shape of an annular disc is attached to the rotor support member 22 so as to rotate therewith. The plate-like member 27 is attached to a part of the rotor holding portion 25 which is located on the first side L1 in the axial direction with respect to the central part in the axial direction L of the rotor holding portion 25. A space that is defined by the rotor holding portion 25 on its radially outer side R2 and defined by the radially extending portion 26 and the plate-like member 27 on its both sides in the axial direction L is thus formed on the radially inner side R1 of the rotor holding portion 25. This space is an oil-tight space defined by sealing members placed as appropriate in each part, etc., and a hydraulic oil pressure chamber H1 and a circulating oil pressure chamber H2 of the first clutch C1, which are described below, are formed in this space.

2-2. First Clutch

The first clutch C1 is an engagement device that can be hydraulically operated to change its engagement state. In the present embodiment, the first clutch C1 selectively couples the input shaft I to the rotating electrical machine MG. The first clutch C1 can switch the engagement state between two engagement members that are engaged with each other by the first clutch C1 between a state where the two engagement members are engaged with each other (including a slip-engaged state) and a state where the two engagement members are not engaged with each other (a disengaged state). In the state where the two engagement members are engaged with each other, a driving force is transmitted between the input shaft I and the rotor member 21. In the state where the two engagement members are disengaged from each other, no driving force is transmitted between the input shaft I and the rotor member 21.

As shown in FIGS. 3 and 4, the first clutch C1 is placed in the oil-tight space defined by the rotor holding portion 25 on its radially outer side R2 and defined by the radially extending portion 26 and the plate-like member 27 on its both sides in the axial direction L. The first clutch C1 is thus positioned so as to partially overlap the rotating electrical machine MG as viewed in the radial direction of the rotating electrical machine MG (in this example, the same direction as the radial direction R). Specifically, the first clutch C1 is positioned on the radially inner side R1 of the rotor Ro so as to overlap the central region in the axial direction L of the rotor Ro as viewed in the radial direction R. As used herein, regarding arrangement of two members, the expression "partially overlap as viewed in a predetermined direction" means that when the predetermined direction is a viewing direction and a viewing point is moved in each direction perpendicular to the viewing direction, the viewing point from which the two members are seen to overlap each other is present in at least a part of the range where the viewing point is moved.

In the present embodiment, the first clutch C1 is configured as a wet multi-plate clutch mechanism. Specifically, the first clutch C1 includes a clutch hub 51, friction members 53, a piston 54, and a biasing member 55. All of these members are positioned so as to partially overlap the rotor Ro as viewed in the radial direction R. In this example, the rotor holding portion 25 of the rotor support member 22 functions as a clutch drum. The first clutch C1 has pairs of input-side and output-side friction members as the friction members 53. The input-side friction members are supported from the radially inner side R1 by an outer peripheral portion of the clutch hub 51, and the output-side friction members are supported from the radially outer side R2 by an inner peripheral portion of the rotor holding portion 25. The clutch hub 51 has its end on the radially inner side R1 coupled to a flange portion Ia of the input shaft I.

As shown in FIG. 4, the hydraulic oil pressure chamber H1 of the first clutch C1 is surrounded by the radially extending portion 26 and the second axially projecting portion 24 of the rotor support member 22 and the piston 54. The circulating oil pressure chamber H2 of the first clutch C1 is mainly surrounded by the rotor holding portion 25 of the rotor support member 22 (clutch drum), the plate-like member 27 attached to the rotor support member 22, and the piston 54, and the clutch hub 51 and the friction members 53 are accommodated in the circulating oil pressure chamber H2. The hydraulic oil pressure chamber H1 and the circulating oil pressure chamber H2 are placed on both sides in the axial direction L of the piston 54 and are separated from each other in an oil-tight manner by a sealing member. In the present embodiment, both the hydraulic oil pressure chamber H1 and the circulating oil pressure chamber H2 are positioned on the radially inner side R1 of the rotor Ro so as to overlap the rotor Ro along their entire lengths in the axial direction L as viewed in the radial direction R.

The biasing member 55 presses the piston 54 toward the friction members 53 in the axial direction L (in this example, toward the first side L1 in the axial direction). The first clutch C1 is thus engaged or disengaged in accordance with the balance between the pressing force applied to the piston 54 toward the first side L1 in the axial direction by the oil pressure in the hydraulic oil pressure chamber H1 and by the biasing member 55 and the pressing force applied to the piston 54 toward the second side L2 in the axial direction by the oil pressure in the circulating oil pressure chamber H2. That is, in the present embodiment, the engagement state of the first clutch C1 can be controlled by sliding the piston 54 in the axial direction L in accordance with the difference in oil pressure (differential pressure) between the hydraulic oil pressure chamber H1 and the circulating oil pressure chamber H2. The circulating oil pressure chamber H2 is basically filled with oil of a predetermined pressure or higher during traveling of the vehicle, and the friction members 53 are cooled by this oil.

2-3. Torque Converter

The torque converter TC drivingly couples the rotating electrical machine MG to the speed change mechanism TM and includes the coupling input-side member 2 that is drivingly coupled to the rotor member 21 of the rotating electrical machine MG, and the coupling output-side member 4 that makes a pair with the coupling input-side member 2 and that is drivingly coupled to the wheels W. In the present embodiment, as shown in FIG. 1, the torque converter TC includes a pump impeller 61, a turbine runner 62, a second clutch C2 as a lockup clutch, and a cover portion (not shown). Although detailed description of the configuration of the torque converter TC is omitted, the cover portion is coupled to the pump impeller 61 placed therein so as to rotate therewith, and is also coupled to a pump drive shaft described below so as to rotate therewith. In the present embodiment, the pump impeller 61, the cover portion, and the pump drive shaft form the coupling input-side member 2. The second clutch C2, the turbine runner 62, etc. are accommodated in the internal space surrounded by these members. That is, the coupling input-side member 2 also serves as a housing accommodating the body of the torque converter TC (hereinafter simply referred to as the torque converter TC). This internal space is a space defined in an oil-tight manner. The coupling output-side member 4 is formed by the turbine runner 62, and the turbine runner 62 is coupled to the intermediate shaft M. The coupling output-side member 4 is thus drivingly coupled to the wheels W via the intermediate shaft M, the speed change mechanism TM, the output shaft O, and the output differential gear unit DF.

In the present embodiment, as shown in FIG. 4, the coupling input-side member 2 is coupled to the rotor member 21 via the coupling member 10 so as to rotate therewith. Specifically, as shown in FIG. 4, the second support wall 32 of the case 3 has a tubular projecting portion 32a. The coupling member 10 has a tubular axially extending portion extending in the axial direction L on the radially inner side R1 of the tubular projecting portion 32a, and an annular disc-shaped radially extending portion extending in the radial direction R on the first side L1 in the axial direction of the tubular projecting portion 32a. The cover portion forming the coupling input-side member 2 is spline-coupled to the axially extending portion of the coupling member 10, and the cover portion and the coupling member 10 are fixed to each other by a fastening member 90 such that they cannot move relative to each other in the axial direction. The second axially projecting portion 24 of the rotor member 21 is coupled to the radially extending portion of the coupling member 10 so as to rotate therewith while being movable relative to the radially extending portion of the coupling member 10 in the axial direction L. The coupling input-side member 2 is thus drivingly coupled to the rotor member 21 so as to rotate therewith.

2-4. Case

The case 3 accommodates the rotating electrical machine MG, the torque converter TC, the speed change mechanism TM, and the first clutch C1. In the present embodiment, as shown in FIG. 2, the case 3 includes a first support wall 31, the second support wall 32, a third support wall 33, and a peripheral wall 34. The peripheral wall 34 is formed in a substantially cylindrical shape that surrounds the rotating electrical machine MG, the first clutch C1, the torque converter TC, the speed change mechanism TM, etc. The first support wall 31, the second support wall 32, and the third support wall 33 are arranged in this order from the first side L1 in the axial direction so as to divide in the axial direction L a space in the case which is formed on the radially inner side R1 of the peripheral wall 34.

As shown in FIG. 2, the case 3 forms a rotating electrical machine accommodating space SG accommodating the rotating electrical machine MG, a fluid coupling accommodating space SC accommodating the torque converter TC, and a speed change mechanism accommodating space SM accommodating the speed change mechanism TM. In the present embodiment, the first clutch C1 is accommodated in the rotating electrical machine accommodating space SG. The rotating electrical machine accommodating space SG, the fluid coupling accommodating space SC, and the speed change mechanism accommodating space SM are formed in this order from the first side L1 in the axial direction. That is, the fluid coupling accommodating space SC is formed between the rotating electrical machine accommodating space SG and the speed change mechanism accommodating space SM in the axial direction L of the speed change mechanism TM. In the present embodiment, the rotating electrical machine MG and the first clutch C1, the torque converter TC, and the speed change mechanism TM are thus arranged in this order from the first side L1 to the second side L2 in the axial direction. That is, the rotating electrical machine MG, the first clutch C1, and the torque converter TC are placed on the first side L1 in the axial direction of the speed change mechanism TM. The rotating electrical machine accommodating space SG, the fluid coupling accommodating space SC, and the speed change mechanism accommodating space SM are spaces that are independent of each other. The expression "spaces that are independent of each other" means that the spaces are separated from each other in an oil-tight manner. Such a configuration is implemented by placing sealing members as appropriate in each part.

All of the rotating electrical machine accommodating space SG, the fluid coupling accommodating space SC, and the speed change mechanism accommodating space SM are annular spaces. Specifically, the rotating electrical machine accommodating space SG is formed between the first support wall 31 and the second support wall 32 in the axial direction L. The fluid coupling accommodating space SC is formed between the second support wall 32 and the third support wall 33 in the axial direction L. The speed change mechanism accommodating space SM is formed between the third support wall 33 and a support wall (not shown) placed on the second side L2 in the axial direction of the third support wall 33 in the axial direction L. All of the rotating electrical machine accommodating space SG, the fluid coupling accommodating space SC, and the speed change mechanism accommodating space SM are defined by the peripheral wall 34 on their radially outer sides R2. The damper 16 is accommodated in a space in the case 3 which is located on the first side L1 in the axial direction of the first support wall 31.

In the present embodiment, as shown in FIG. 2, the case 3 can be divided into a first case portion 3a and a second case portion 3b placed on the second side L2 in the axial direction of the first case portion 3a. The first case portion 3a and the second case portion 3b are coupled together at a joint portion 5. In the present embodiment, the respective peripheral walls 34 of the first case portion 3a and the second case portion 3b are fixedly fastened to each other by fastening bolts (not shown). A part of the peripheral wall 34 which is formed by the first case portion 3a is hereinafter referred to as the "first peripheral wall 34a," and a part of the peripheral wall 34 which is formed by the second case portion 3b is hereinafter referred to as the "second peripheral wall 34b."

The first case portion 3a is a portion that forms the rotating electrical machine accommodating space SG. Specifically, the first case portion 3a has the first support wall 31 and the second support wall 32, and the rotating electrical machine accommodating space SG is formed only by the first case portion 3a. In the present embodiment, the first case portion 3a further forms the space accommodating the damper 16. The second case portion 3b is a portion that forms the speed change mechanism accommodating space SM. Specifically, the second case portion 3b has the third support wall 33, and the speed change mechanism accommodating space SM is formed only by the second case portion 3b. The first case portion 3a and the second case portion 3b together form the fluid coupling accommodating space SC in a region in the axial direction L which includes the joint portion 5 between the first case portion 3a and the second case portion 3b.

In the present embodiment, oil is supplied to the rotating electrical machine accommodating space SG and the speed change mechanism accommodating space SM. Specifically, oil is supplied to the rotating electrical machine accommodating space SG in order to lubricate and cool each part of the rotating electrical machine MG, to lubricate and cool the first clutch C1, and to drive a hydraulic servo. Oil is supplied to the speed change mechanism accommodating space SM in order to lubricate and cool each gear of the speed change mechanism TM, to lubricate and cool a plurality of engagement devices of the speed change mechanism TM, and to drive a hydraulic servo. Oil is therefore present in the rotating electrical machine accommodating space SG and the speed change mechanism accommodating space SM (wet state). The fluid coupling accommodating space SC is configured such that no oil is supplied to a region around the torque converter TC. In the present embodiment, no oil is supplied to the fluid coupling accommodating space SC other than a space accommodating the body of the torque converter TC. Specifically, as described above, oil is supplied to the internal space surrounded by the coupling input-side member 2 in the fluid coupling accommodating space SC and this internal space is oil-tight, and no oil is present in a region other than the internal space in the fluid coupling accommodating space SC (dry state).

The rotating electrical machine accommodating space SG has a second oil reservoir portion U2 (i.e., second oil reservoir) that can store oil. In the present embodiment, the lower part of the rotating electrical machine accommodating space SG forms the second oil reservoir portion U2. Oil supplied to the rotating electrical machine MG is stored in the second oil reservoir portion U2 formed in the lower part of the rotating electrical machine accommodating space SG. The speed change mechanism accommodating space SM communicates with a first oil reservoir portion U1 (i.e., first oil reservoir) that can store oil. In the present embodiment, as shown in FIG. 2, the speed change mechanism accommodating space SM communicates with a first accommodating space S1 that is surrounded by the lower surface of the second case portion 3b forming the speed change mechanism accommodating space SM and by a first oil pan 11 placed below the speed change mechanism accommodating space SM. Oil supplied to the speed change mechanism TM is stored in the first accommodating space S1 communicating with the speed change mechanism accommodating space SM via a fourth hole P5 (described below). That is, the first accommodating space S1 forms the first oil reservoir portion U1.

2-4-1. First Support Wall

As shown in FIG. 2, the first support wall 31 is formed on the first side L1 in the axial direction of the rotating electrical machine MG (in this example, between the rotating electrical machine MG and the damper 16 in the axial direction L) so as to extend in the radial direction R and the circumferential direction. The first support wall 31 in the shape of a circular plate has a through hole extending in the axial direction L in its center in the radial direction R, and has the input shaft I inserted through this through hole. The first support wall 31 is shaped such that a part of the first support wall 31 which is located on the radially inner side R1 is offset as a whole in the axial direction L so as to be located on the second side L2 in the axial direction with respect to a part of the first support wall 31 which is located on the radially outer side R2.

2-4-2. Second Support Wall

As shown in FIG. 2, the second support wall 32 is formed between the rotating electrical machine MG and the torque converter TC in the axial direction L so as to extend in the radial direction R and the circumferential direction. The second support wall 32 in the shape of a circular plate has a through hole extending in the axial direction L in its center in the radial direction R, and has the coupling member 10 placed in this through hole. The coupling input-side member 2 placed on the second side L2 in the axial direction of the second support wall 32 and the rotor member 21 placed on the first side L1 in the axial direction of the second support wall 32 are drivingly coupled to each other via the coupling member 10 so as to rotate together.

As shown in FIG. 4, the second support wall 32 has, at its end on the radially inner side R1, the tubular projecting portion 32a projecting to the first side L1 in the axial direction. The second support wall 32 has, at its end on the radially inner side R1, a thick portion (boss portion) having a predetermined thickness in the axial direction L. The tubular projecting portion 32a is positioned on the radially inner side R1 of the rotor member 21 so as to partially overlap the rotor member 21 as viewed in the radial direction R.

A first oil passage A1 and a second oil passage A2 are formed in the second support wall 32. As shown in FIGS. 3 and 4, the first oil passage A1 is an oil supply path that communicates with the hydraulic oil pressure chamber H1 of the first clutch C1 to supply oil for operating the piston 54 to the hydraulic oil pressure chamber H1. As shown in FIG. 4, the second oil passage A2 is an oil supply path that communicates with the circulating oil pressure chamber H2 of the first clutch C1 to supply oil for cooling the friction members 53 to the circulating oil pressure chamber H2. As shown in FIG. 4, the first oil passage A1 extends toward the first side L1 in the axial direction in the tubular projecting portion 32a and then communicates with the hydraulic oil pressure chamber H1 via a communication hole 32c formed in the tubular projecting portion 32a, a through hole 94c formed in a sleeve member 94, and a through hole 24c formed in the second axially projecting portion 24 of the rotor support member 22. The sleeve member 94 serves to restrict oil flow in the axial direction L through a clearance in the radial direction between the outer peripheral surface of the tubular projecting portion 32a and the inner peripheral surface of the second axially projecting portion 24.

As shown in FIG. 4, the second oil passage A2 is formed so as to extend toward the first side L1 in the axial direction in the tubular projecting portion 32a and then to open to the end face on the first side L1 in the axial direction of the tubular projecting portion 32a. This opening of the second oil passage A2 opens to a clearance in the axial direction L which is provided between the coupling member 10 and the tubular projecting portion 32a. A clearance extending through the second axially projecting portion 24 in the radial direction R is formed in the connection portion of the second axially projecting portion 24 with the coupling member 10. The second oil passage A2 communicates with the circulating oil pressure chamber H2 through these two clearances.

2-4-3. Third Support Wall

As shown in FIG. 2, the third support wall 33 is formed on the second side L2 in the axial direction of the torque converter TC (in this example, between the torque converter TC and the speed change mechanism TM in the axial direction L) so as to extend in the radial direction R and the circumferential direction. Although not shown in detail in the figures, the third support wall 33 in the shape of a circular plate has a through hole extending in the axial direction L in its center in the radial direction R, and has the intermediate shaft M (not shown) inserted through this through hole. The third support wall 33 is provided with a hydraulic pump 9 that generates an oil pressure for supplying oil to each part of the vehicle drive device 1. A suction oil passage (not shown) and a discharge oil passage AB of the hydraulic pump 9 are formed in the third support wall 33.

2-4-4. First Peripheral Wall

The first peripheral wall 34a has a first hole P1, a second hole P2, and a sixth hole P7. The first peripheral wall 34a further has a recess P4. The first hole P1 is a hole extending from the inner peripheral surface of the first peripheral wall 34a to the outer peripheral surface thereof. In the present embodiment, as shown in FIG. 3, the first hole P1 is formed in the lower part of the first peripheral wall 34a. The recess P4 is a portion formed in the outer periphery of the first peripheral wall 34a so as to be recessed toward the radially inner side R1. In the present embodiment, the recess P4 is formed in the lower part of the first peripheral wall 34a. Specifically, the recess P4 is formed in a downward projecting portion of the lower part of the first peripheral wall 34a, namely a portion projecting downward with respect to the remaining portion of the lower part of the first peripheral wall 34a. The first hole P1 extends through a part of the bottom (portion having a surface facing downward) of the recess P4 in the radial direction R (in this example, the vertical direction). The first hole P1 is positioned so as to partially overlap the rotating electrical machine MG as viewed in the radial direction R (in this example, the vertical direction). That is, the first hole P1 is formed in a part of the first peripheral wall 34a which forms the rotating electrical machine accommodating space SG.

As shown in FIGS. 2 and 3, the first hole P1 that forms a part of a discharge oil passage AD (described below) has a peripheral wall opening 36 (introducing opening ADi described below) that opens to the rotating electrical machine accommodating space SG. In the present embodiment, the peripheral wall opening 36 opens to the second oil reservoir portion U2 in the lower part of the rotating electrical machine accommodating space SG. As shown in FIG. 3, the peripheral wall opening 36 is formed such that the lowest end of the peripheral wall opening 36 (introducing opening ADi) is located lower than the lowest end MGu of the rotating electrical machine MG. The lowest end of the peripheral wall opening 36 (introducing opening ADi) herein refers to a part of the peripheral edge of the peripheral wall opening 36 which is located at the lowest position. In the present embodiment, the inner peripheral surface of the first peripheral wall 34a is formed in a cylindrical shape so as to conform to the outer peripheral surface of a stator core of the rotating electrical machine MG. Accordingly, the peripheral edge of the peripheral wall opening 36 is also shaped so as to conform to the cylindrical inner peripheral surface. The lowest end of the peripheral wall opening 36 is therefore a part of the peripheral edge of the peripheral wall opening 36 conforming to the cylindrical inner peripheral surface which is located vertically below the axis X. The lowest end MGu of the rotating electrical machine MG is a part of the constituent members of the rotating electrical machine MG which is located at the lowest position. In the present embodiment, as shown in FIG. 3, the lowest end MGu of the rotating electrical machine MG is a part of the cylindrical outer peripheral surface of the stator St which is located vertically below the axis X.

The second hole P2 is a hole extending in the axial direction L in the first peripheral wall 34a. In the present embodiment, as shown in FIG. 3, a wall 63 defining the periphery of the recess P4 is formed in the lower part of the first peripheral wall 34a so as to protrude downward. The second hole P2 extends in the axial direction L through the wall 63 formed on the second side L2 in the axial direction of the recess P4. At the joint portion 5, the second hole P2 is connected to a third hole P3 (described below) formed in the second peripheral wall 34b of the second case portion 3b. The second hole P2 is formed in a part of the first peripheral wall 34a which forms the fluid coupling accommodating space SC. That is, the second hole P2 is formed on the second side L2 in the axial direction with respect to the first hole P1. The second hole P2 is an independent hole that does not communicate with the fluid coupling accommodating space SC.

The sixth hole P7 is a hole extending in the axial direction L in the first peripheral wall 34a. In the present embodiment, the sixth hole P7 is formed in the part of the first peripheral wall 34a which forms the fluid coupling accommodating space SC. Specifically, the sixth hole P7 is formed in the lower side of the fluid coupling accommodating space SC. More specifically, as shown in FIG. 3, the sixth hole P7 is formed above the second hole P2 at a different circumferential position from the second hole P2. The sixth hole P7 is an independent hole that does not communicate with the fluid coupling accommodating space SC. The sixth hole P7 is connected on its first side L1 in the axial direction to a second hydraulic control device 82 (i.e., hydraulic control), and is connected on its second side L2 in the axial direction to a fifth hole P6 formed in the second case portion 3b. Since the sixth hole P7 is formed at a different circumferential position from the second hole P2, the sixth hole P7 is shown by dashed lines in FIGS. 2 and 3.

2-4-5. Second Peripheral Wall

The second peripheral wall 34b has the third hole P3, the fourth hole P5, and the fifth hole P6. The third hole P3 is a hole that extends in the axial direction L in the lower part of the second peripheral wall 34b. In the present embodiment, as shown in FIG. 3, the third hole P3 is formed in a part of the second peripheral wall 34b which forms the fluid coupling accommodating space SC. Specifically, the third hole P3 is an independent hole that is formed below the fluid coupling accommodating space SC and that does not communicate with the fluid coupling accommodating space SC. The third hole P3 is connected on its first side L1 in the axial direction to the second hole P2 formed in the first case portion 3a, and is connected on its second side L2 in the axial direction to the first accommodating space S1 (first oil reservoir portion U1). In the present embodiment, the third hole P3 is tilted upward from its first side L1 in the axial direction toward its second side L2 in the axial direction.

The third hole P3 that forms a part of the discharge oil passage AD (described below) has a discharge opening ADo that opens to the first accommodating space S1 (first oil reservoir portion U1). In the present embodiment, as shown in FIGS. 2 and 3, the discharge opening ADo is positioned such that the lowest end AHo of the discharge opening ADo is located below the lowest end Rou of the rotor Ro of the rotating electrical machine MG. The lowest end AHo of the discharge opening ADo herein refers to a part of the peripheral edge of the discharge opening ADo which is located at the lowest position. The lowest end Rou of the rotor Ro herein refers to a part of the constituent members of the rotor Ro which is located at the lowest position. In the present embodiment, the lowest end Rou of the rotor Ro is a part of the cylindrical outer peripheral surface of the rotor Ro which is located vertically below the axis X.

As shown in FIG. 2, the fourth hole P5 is a hole extending from the inner peripheral surface of the second peripheral wall 34b to the outer peripheral surface thereof. In the present embodiment, the fourth hole P5 is formed in the lower part of the second peripheral wall 34b so as to extend therethrough in the radial direction R. The fourth hole P5 is formed in a part of the second peripheral wall 34b which forms the speed change mechanism accommodating space SM. The fourth hole P5 is positioned so as to partially overlap the central part in the axial direction L of the speed change mechanism TM as viewed in the radial direction R, and is also positioned so as to partially overlap the speed change mechanism TM as viewed from below. The speed change mechanism accommodating space SM communicates with the first accommodating space S1 formed below the speed change mechanism accommodating space SM via the fourth hole P5.

The fifth hole P6 is a hole extending in the axial direction L in the second peripheral wall 34b. In the present embodiment, the fifth hole P6 is formed in the part of the second peripheral wall 34b which forms the fluid coupling accommodating space SC. Specifically, the fifth hole P6 is formed in the lower side of the fluid coupling accommodating space SC. More specifically, as shown in FIG. 3, the fifth hole P6 is formed above the third hole P3 at a different circumferential position from the third hole P3. The fifth hole P6 is an independent hole that does not communicate with the fluid coupling accommodating space SC. The fifth hole P6 is connected on its first side L1 in the axial direction to the sixth hole P7 formed in the first case portion 3a, and is connected on its second side L2 in the axial direction to a first hydraulic control device 81. In the present embodiment, the fifth hole P6 is tilted downward from its second side L2 in the axial direction toward its first side L1 in the axial direction. Since the fifth hole P6 is formed at a different circumferential position from the third hole P3, the fifth hole P6 is shown by dashed lines in FIGS. 2 and 3.

The second hole P2 in the first peripheral wall 34a and the third hole P3 in the second peripheral wall 34b form a second discharge oil passage AH that is a part of the discharge oil passage AD. The sixth hole P7 in the first peripheral wall 34a and the fifth hole P6 in the second peripheral wall 34b form a third oil passage A3. As described above, the second hole P2, the third hole P3, the fifth hole P6, and the sixth hole P7 are holes that do not communicate with the fluid coupling accommodating space SC. The third oil passage A3 and the second discharge oil passage AH which are formed by the second hole P2, the third hole P3, the fifth hole P6, and the sixth hole P7 are therefore independent oil passages that do not communicate with the fluid coupling accommodating space SC. Accordingly, even if the fluid coupling accommodating space SC in the dry state is provided between the rotating electrical machine accommodating space SG and the speed change mechanism accommodating space SM which are in the wet state as oil is supplied thereto, oil can be appropriately supplied and discharged between the rotating electrical machine accommodating space SG and the speed change mechanism accommodating space SM.

2-5. Hydraulic Pump

As described above, the pump drive shaft that drives the hydraulic pump 9 is drivingly coupled to the pump impeller 61 of the torque converter TC so as to rotate therewith. Since the pump impeller 61 is drivingly coupled to the rotating electrical machine MG and the internal combustion engine E as shown in FIG. 1, the hydraulic pump 9 is driven by the internal combustion engine E or the rotating electrical machine MG serving as a driving force source for the wheels W to discharge oil. The hydraulic pump 9 supplies oil in the first oil reservoir portion U1 to the speed change mechanism TM and the rotating electrical machine MG. Specifically, the oil pressure generated by the hydraulic pump 9 is controlled by the first hydraulic control device 81 described below, and the controlled oil pressure is supplied to the torque converter TC and the speed change mechanism TM. The oil pressure generated by the hydraulic pump 9 is also controlled by the second hydraulic control device 82 described below, and the controlled oil pressure is supplied to the first clutch C1. In the present embodiment, oil supplied to the circulating oil pressure chamber H2 of the first clutch C1 is supplied to the rotating electrical machine MG after flowing through the circulating oil pressure chamber H2.

3. Configuration of Supplying Oil Pressure

The configuration of supplying an oil pressure in the vehicle drive device 1 according to the present embodiment will be described. The vehicle drive device 1 includes the first hydraulic control device 81 as a hydraulic control device that controls an oil pressure supplied from the hydraulic pump 9, and includes the second hydraulic control device 82 separately from the first hydraulic control device 81.

3-1. First Hydraulic Control Device

The first hydraulic control device 81 is a device that controls an oil pressure supplied from the hydraulic pump 9 to supply the controlled oil pressure to the torque converter TC and the speed change mechanism TM. As shown in FIG. 2, in the present embodiment, the first hydraulic control device 81 is provided on the second case portion 3b, and in this example, is provided on the lower part of the second case portion 3b. Specifically, the first hydraulic control device 81 is fixed to the outer periphery of the second peripheral wall 34b of the second case portion 3b (in this example, a part of the outer periphery which has a surface facing downward). In the present embodiment, the first hydraulic control device 81 is positioned so as to partially overlap the speed change mechanism TM as viewed in the radial direction R, namely the radial direction of the speed change mechanism TM. In this example, as shown in FIG. 2, the first hydraulic control device 81 is positioned so as to overlap the speed change mechanism TM along its entire length in the axial direction L as viewed in the radial direction R.

Specifically, the case 3 includes the first oil pan 11 that is attached to the lower part of the second case portion 3b, and the space surrounded by the second case portion 3b and the first oil pan 11 serves as the first accommodating space S1 accommodating the first hydraulic control device 81 (first oil reservoir portion U1), as described above. The first accommodating space S1 is positioned so as to partially overlap the speed change mechanism TM as viewed from below. The first hydraulic control device 81 is accommodated in the first accommodating space S1 and is positioned so as to partially overlap the speed change mechanism TM as viewed from below.

The first hydraulic control device 81 includes a plurality of hydraulic control valves and an oil flow path. The hydraulic control valves of the first hydraulic control device 81 include a speed change mechanism hydraulic control valve (not shown) that controls an oil pressure to be supplied to the speed change mechanism TM, and a fluid coupling hydraulic control valve (not shown) that controls an oil pressure to be supplied to the torque converter TC. The oil pressure supplied to the speed change mechanism TM is used to control the engagement state of each engagement device included in the speed change mechanism TM, and is also used to lubricate and cool a gear mechanism, a bearing, etc. which are included in the speed change mechanism TM. The oil pressure supplied to the torque converter TC is used as oil for power transmission in the torque converter TC, and is also supplied to a hydraulic oil pressure chamber of the second clutch C2 so as to be used to control the engagement state of the second clutch C2. The oil supplied to the speed change mechanism TM and the torque converter TC is returned to the first oil pan 11 placed below the speed change mechanism TM.

Although details are omitted, an oil cooler (heat exchanger) that cools oil is disposed in series or in parallel in an oil circulating path that extends in the hydraulic pump 9, the first hydraulic control device 81, the torque converter TC, and the speed change mechanism TM. This oil cooler is provided in the second case portion 3b. For example, the oil cooler may be configured such that at least oil supplied to a heat generating portion is returned to the first oil pan 11 via the oil cooler, or at least oil to be supplied to the heat generating portion is supplied via the oil cooler to a portion to which oil is to be supplied.

A line pressure, namely a discharge pressure (output pressure) of the hydraulic pump 9, is controlled by a line pressure control valve (not shown). For example, a pressure regulator valve is used for the line pressure control valve and controls the line pressure based on a reference pressure supplied to a reference pressure chamber. In the present embodiment, the line pressure control valve is provided in the first hydraulic control device 81, and the oil pressure controlled (regulated) by the line pressure control valve is supplied to the second hydraulic control device 82 via the third oil passage A3.

3-2. Second Hydraulic Control Device

The second hydraulic control device 82 is a device that controls an oil pressure supplied from the hydraulic pump 9 to supply the controlled oil pressure to the first clutch C1. As shown in FIG. 2, in the present embodiment, the second hydraulic control device 82 is provided on the first case portion 3a. The first case portion 3a is located on the first side L1 in the axial direction of the second case portion 3b on which the first hydraulic control device 81 is provided. In the present embodiment, the second hydraulic control device 82 is thus located on the first side L1 in the axial direction of the first hydraulic control device 81. Specifically, the first hydraulic control device 81 is located on the second side L2 in the axial direction of the joint portion 5 between the first case portion 3a and the second case portion 3b, and the second hydraulic control device 82 is located on the first side L1 in the axial direction of the joint portion 5. In the present embodiment, the second hydraulic control device 82 is located below the upper end of the first hydraulic control device 81.

In the present embodiment, the second hydraulic control device 82 is provided on the lower part of the first case portion 3a. Specifically, the second hydraulic control device 82 is accommodated in the recess P4 formed in the outer periphery of the first peripheral wall 34a and fixed to the bottom (portion having the surface facing downward) of the recess P4. The case 3 includes a second oil pan 12 that is attached to the lower part of the first case portion 3a. In the present embodiment, the second oil pan 12 is attached to the first peripheral wall 34a so as to cover the entire recess P4 (first hole P1). The space surrounded by the first case portion 3a and the second oil pan 12 is a second accommodating space S2 accommodating the second hydraulic control device 82. Specifically, the second accommodating space S2 is the space surrounded by the second oil pan 12 and a part of the first case portion 3a which forms the first hole P1 and the recess P4. The second accommodating space S2 is positioned below the rotating electrical machine accommodating space SG so as to partially overlap the rotating electrical machine MG as viewed in the vertical direction. The second accommodating space S2 communicates with the second oil reservoir portion U2 of the rotating electrical machine accommodating space SG via the peripheral wall opening 36 formed in the upper part (ceiling part) of the second accommodating space S2. The second accommodating space S2 is thus basically filled with oil supplied from the second oil reservoir portion U2.

The second accommodating space S2 also communicates with the second hole P2 that forms the second discharge oil passage AH. That is, the second accommodating space S2 communicates with the first accommodating space S1 (first oil reservoir portion U1) via the second discharge oil passage AH.

The discharge oil passage AD is formed by a first discharge oil passage AG and the second discharge oil passage AH. In the present embodiment, as described above, an oil path is formed such that oil supplied from the second oil reservoir portion U2 to the second accommodating space S2 is discharged to the first oil reservoir portion U1 via the second discharge oil passage AH. That is, in the present embodiment, the second accommodating space S2 forms the first discharge oil passage AG. The peripheral wall opening 36 that is a portion where the second accommodating space S2 communicates with the second oil reservoir portion U2 is therefore the introducing opening ADi of the discharge oil passage AD which opens to the second oil reservoir portion U2. As described above, the second hydraulic control device 82 is placed in the second accommodating space S2 that forms the first discharge oil passage AG (discharge oil passage AD). The second hydraulic control device 82 corresponds to the "hydraulic control device."

As shown in FIG. 3, the second oil pan 12 is attached to the peripheral portion of the recess P4 on the outer periphery of the first peripheral wall 34a. The second oil pan 12 is attached to the first peripheral wall 34a so as to be tilted downward from its first side L1 in the axial direction toward its second side L2 in the axial direction. That is, the second accommodating space S2 is a space whose bottom (lower part) is tilted downward from its first side L1 in the axial direction toward its second side L2 in the axial direction. With this configuration, the second accommodating space S2 can appropriately and easily guide oil supplied from the second oil reservoir portion U2 to the second accommodating space S2 toward the first oil reservoir portion U1.

The second oil pan 12 is provided independently of the first oil pan 11. That is, the first oil pan 11 and the second oil pan 12 are formed by separate members from each other and are attached to different positions on the case 3 from each other. Specifically, the first oil pan 11 is placed on the second side L2 in the axial direction of the joint portion 5 between the first case portion 3a and the second case portion 3b, and the second oil pan 12 is placed on the first side L1 in the axial direction of the joint portion 5.

As shown in FIG. 3, the second hydraulic control device 82 is positioned so as to partially overlap the rotating electrical machine MG as viewed in the radial direction of the rotating electrical machine MG (in this example, the same direction as the radial direction R). In this example, the second hydraulic control device 82 is shifted to the second side L2 in the axial direction with respect to the rotating electrical machine MG such that a part of the second hydraulic control device 82 which is located on the first side L1 in the axial direction overlaps the rotating electrical machine MG (specifically, the stator St) as viewed in the radial direction R. The second accommodating space S2 is thus shifted to the second side L2 in the axial direction accordingly. This can reduce the distance between the first accommodating space S1 and the second accommodating space S2, namely the axial length of the second discharge oil passage AH connecting the first accommodating space S1 and the second accommodating space S2, and can reduce flow resistance of oil in the second discharge oil passage AH. In the present embodiment, the second hydraulic control device 82 is also positioned so as to partially overlap the rotating electrical machine MG as viewed from below.

As shown in FIG. 3, the second hydraulic control device 82 is positioned so as to partially overlap the first clutch C1 as viewed in the radial direction of the first clutch C1 (in this example, the same direction as the radial direction R). In the present embodiment, the second hydraulic control device 82 is positioned so as to partially overlap at least a part of the clutch hub 51, the piston 54, the friction members 53, the clutch drum (in this example, the rotor holding portion 25), the hydraulic oil pressure chamber H1, and the circulating oil pressure chamber H2 that form the first clutch C1, as viewed in the radial direction R. In this example, the second hydraulic control device 82 is positioned so as to partially overlap a servo mechanism (the piston 54 and the hydraulic oil pressure chamber H1) as viewed in the radial direction R.

Figure 5:
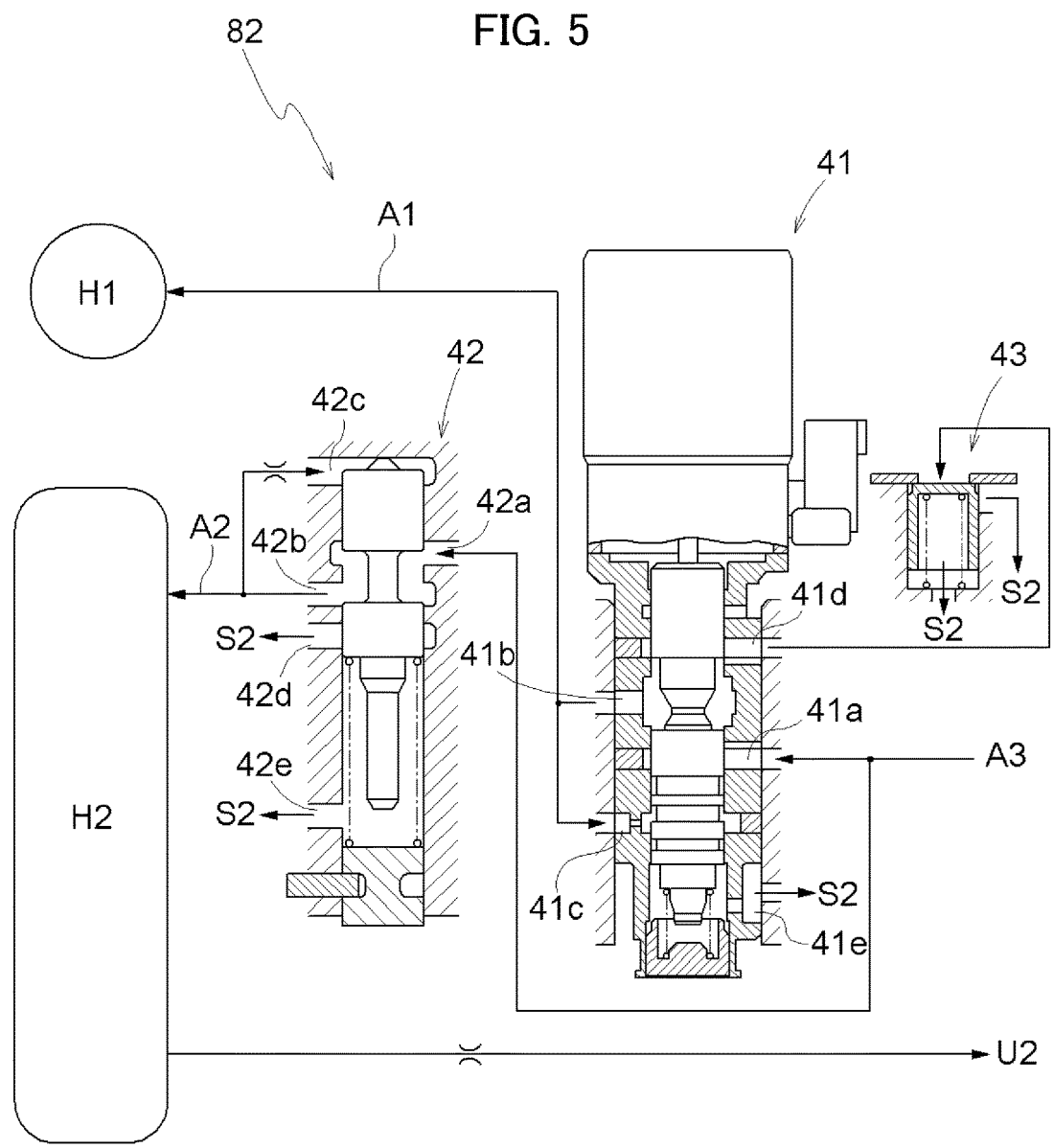
FIG. 5 is a view showing the general configuration of a hydraulic control system of a second hydraulic control device according to the embodiment.

The second hydraulic control device 82 includes a hydraulic control valve that controls an oil pressure to be supplied to the first clutch C1. In the present embodiment, the second hydraulic control device 82 includes a plurality of hydraulic control valves (a first hydraulic control valve 41, a second hydraulic control valve 42, and a third hydraulic control valve 43) and a valve body 83 having an oil passage communicating with the hydraulic control valves. In the present embodiment, as shown in FIG. 3, oil discharged from the hydraulic pump 9 is supplied to the second hydraulic control device 82 via the first hydraulic control device 81 and the third oil passage A3. As described above, a line pressure controlled by the first hydraulic control device 81 is supplied to the third oil passage A3 and is supplied to the second hydraulic control device 82. The second hydraulic control device 82 controls the line pressure and supplies the controlled oil pressure to the first clutch C1 via the first oil passage A1. Specifically, as shown in FIG. 5, the second hydraulic control device 82 includes the first hydraulic control valve 41 and the second hydraulic control valve 42 as the hydraulic control valves. The first hydraulic control valve 41 is a hydraulic control valve that controls an oil pressure to be supplied to the hydraulic oil pressure chamber H1 of the first clutch C1. The second hydraulic control valve 42 is a hydraulic control valve that controls (regulates) an oil pressure to be supplied to the circulating oil pressure chamber H2 of the first clutch C1.

In the present embodiment, the first hydraulic control valve 41 is a linear solenoid valve having an electromagnetic portion and a pressure regulating portion. The electromagnetic portion is a portion functioning as an actuator that controls the position of a valve body (spool). The pressure regulating portion is a portion functioning as a valve and is inserted in a valve insertion hole formed in the valve body 83. The first hydraulic control valve 41 includes an input port 41a to which oil having the line pressure is supplied, an output port 41b that discharges oil to the first oil passage A1, a feedback port 41c that generates a feedback pressure, and a first discharge port 41d and a second discharge port 41e which discharge (drain) oil. Oil having a pressure in accordance with the state of energization to the electromagnetic portion is supplied to the hydraulic oil pressure chamber H1 of the first clutch C1 via the first oil passage A1. The first hydraulic control valve 41 thus communicates with both the first oil passage A1 and the third oil passage A3, and a part of the first oil passage A1 and a part of the third oil passage A3 are formed in the valve body 83.

The first discharge port 41d of the first hydraulic control valve 41 has a function to discharge oil toward the third hydraulic control valve 43 as appropriate in order to adjust the amount of oil to be supplied from the output port 41b to the first oil passage A1 in accordance with the feedback pressure. The first discharge port 41d also has a function to discharge a part of oil in the first oil passage A1 toward the third hydraulic control valve 43 when reducing the oil pressure to be supplied to the hydraulic oil pressure chamber H1. The third hydraulic control valve 43 is a valve that allows its input port to communicate with its output port when the oil pressure that is supplied to the input port of the third hydraulic control valve 43 has a predetermined value or more. That is, the third hydraulic control valve 43 functions to retain oil in the first oil passage A1 and functions as a check valve that restricts backflow of oil from the third hydraulic control valve 43 toward the first hydraulic control valve 41. Oil discharged from the output port of the third hydraulic control valve 43 is discharged to the second accommodating space S2. The second discharge port 41e of the first hydraulic control valve 41 has a function to discharge oil in a spring chamber to the second accommodating space S2 when the oil pressure in the spring chamber becomes high.

In the present embodiment, the second hydraulic control valve 42 is a pressure regulation valve that opens and closes an input port 42a and opens and closes a first discharge port 42d. The second hydraulic control valve 42 includes the input port 42a to which oil having a line pressure is supplied, an output port 42b that discharges oil to the second oil passage A2, a feedback port 42c that generates a feedback pressure, and the first discharge port 42d and a second discharge port 42e which discharge (drain) oil. The oil pressure controlled by the second hydraulic control valve 42 is supplied to the circulating oil pressure chamber H2 of the first clutch C1 via the second oil passage A2. The first discharge port 42d of the second hydraulic control valve 42 has a function to discharge oil to the second accommodating space S2 as appropriate in order to adjust the amount of oil to be supplied from the output port 42b to the second oil passage A2 in accordance with the feedback pressure. The second discharge port 42e of the second hydraulic control valve 42 has a function to discharge oil in a spring chamber to the second accommodating space S2 when the oil pressure in the spring chamber becomes high. The second hydraulic control valve 42 thus communicates with the second oil passage A2, and a part of the second oil passage A2 is formed in the valve body 83.

As described above, the second hydraulic control device 82 is placed in the second accommodating space S2 forming the first discharge oil passage AG. Oil discharged from an oil discharge port of the second hydraulic control device 82 to the second accommodating space S2 is therefore discharged to the first oil reservoir portion U1 in the first accommodating space S1 via the first discharge oil passage AG and the second discharge oil passage AH. In the present embodiment, the first discharge port 41d and the second discharge port 41e of the first hydraulic control valve 41 and the first discharge port 42d and the second discharge port 42e of the second hydraulic control valve 42 form the "oil discharge port" of the second hydraulic control device 82.

In the present embodiment, as shown in FIG. 4, an oil flow path is formed through which oil supplied to the circulating oil pressure chamber H2 of the first clutch C1 via the second oil passage A2 is supplied to the coil end portions Ce of the rotating electrical machine MG via the bearing 96. Oil supplied to the circulating oil pressure chamber H2 can thus be used to cool the bearing 96 supporting the rotor Ro and to cool the rotating electrical machine MG including the coil end portions Ce. Oil discharged from the hydraulic pump 9 is thus supplied to the rotating electrical machine MG.

As shown in FIG. 3, oil supplied to the rotating electrical machine MG is stored in the second oil reservoir portion U2 of the rotating electrical machine accommodating space SG. The oil level in the second oil reservoir portion U2 varies in accordance with the operating state of the vehicle drive device 1. At least when the rotating electrical machine MG is being driven, a large amount of oil is supplied to the rotating electrical machine accommodating space SG in order to cool the stator coil etc. Accordingly, the oil level in the second oil reservoir portion U2 is basically above the lowest end of the introducing opening ADi at least when the rotating electrical machine MG is being driven. In the example of FIG. 3, the oil level in the second oil reservoir portion U2 is below the lowest end Rou of the rotor Ro of the rotating electrical machine MG and above the lowest end MGu of the rotating electrical machine MG (stator core). The oil level in the first oil reservoir portion U1 also varies in accordance with the operating state of the vehicle drive device 1. When the vehicle drive device 1 is not subjected to acceleration and deceleration, the oil level in the first oil reservoir portion U1 is basically below the lowest end AHo of the discharge opening ADo. Accordingly oil flows from the second oil reservoir portion U2 to the first oil reservoir portion U1 due to the difference in oil level between the second oil reservoir portion U2 and the first oil reservoir portion U1. That is, oil in the second oil reservoir portion U2 is discharged to the first oil reservoir portion U1 through the discharge oil passage AD.

As described above, in the present embodiment, relatively hot oil stored in the second oil reservoir portion U2 after cooling the rotating electrical machine MG can be returned to the first oil reservoir portion U1 via the discharge oil passage AD by a simple configuration using the difference in oil level between the first oil reservoir portion U1 and the second oil reservoir portion U2. Since the lowest end of the introducing opening ADi of the discharge oil passage AD is located below the lowest end MGu of the rotating electrical machine MG, oil dropping from above and stored in the second oil reservoir portion U2 can be sequentially introduced into the discharge oil passage AD through the introducing opening ADi located at a lower position. The downward oil flow in the second oil reservoir portion U2 is thus not disturbed and oil in the second oil reservoir portion U2 can thus be discharged as it is to the discharge oil passage AD. This restrains a part of the relatively hot oil having cooled the rotating electrical machine MG from staying in the second oil reservoir portion U2, and oil can be appropriately circulated. This can restrain reduction in efficiency of cooling the rotating electrical machine MG due to oil staying in the second oil reservoir portion U2. Since the second hydraulic control device 82 is located in the discharge oil passage AD, oil discharged from the oil discharge port of the second hydraulic control device 82 to the discharge oil passage AD can also be supplied to the first oil reservoir portion U1. This eliminates the need to provide a separate oil passage in order to return oil discharged from the oil discharge port of the second hydraulic control device 82 to the first oil reservoir portion U1. The second hydraulic control device 82 opens at its both ends in the oil flow direction (the introducing opening ADi and the discharge opening ADo), and discharges oil to the discharge oil passage AD having a relatively low oil pressure. Accordingly, resistance applied at the time oil is discharged from the oil discharge port is lower than in the case where oil is discharged to the second accommodating space S2 that is a substantially sealed space filled with oil and that has a relatively high oil pressure as in Japanese Patent Application Publication No. 2013-095389. Accuracy of oil pressure adjustment by the second hydraulic control device 82 can therefore be easily ensured.

4. Other Embodiments

Lastly, other embodiments of the vehicle drive device will be described. The configuration disclosed in each of the following embodiments may be combined with any of the configurations disclosed in the other embodiments as long as no inconsistency arises.

(1) The above embodiment is described with respect to an example in which oil discharged from the hydraulic pump 9 is supplied to the second hydraulic control device 82 via the first hydraulic control device 81 and the third oil passage A3. However, embodiments of the vehicle drive device are not limited to this. The second hydraulic control device 82 may include a line pressure control valve, and oil discharged from the hydraulic pump 9 may be directly supplied to the second hydraulic control device 82 without flowing through the first hydraulic control device 81.

(2) The above embodiment is described with respect to an example in which the second hydraulic control device 82 is placed in the discharge oil passage AD and oil discharged from the oil discharge port of the second hydraulic control device 82 is supplied to the first oil reservoir portion U1 via the first discharge oil passage AG (second accommodating space S2) and the second discharge oil passage AH, namely via the discharge oil passage AD. However, embodiments of the vehicle drive device are not limited to this. The second hydraulic control device 82 may not be placed in the discharge oil passage AD. In this case, oil discharged from the oil discharge port of the second hydraulic control device 82 is discharged to the first oil reservoir portion U1 via a different oil passage from the discharge oil passage AD.

(3) The above embodiment is described with respect to an example in which the second hydraulic control device 82 is positioned so as to partially overlap the rotating electrical machine MG as viewed in the radial direction of the rotating electrical machine MG. However, embodiments of the vehicle drive device are not limited to this. The second hydraulic control device 82 may be placed at a differential position from the rotating electrical machine MG in the axial direction of the rotating electrical machine MG so as not to partially overlap the rotating electrical machine MG as viewed in the radial direction of the rotating electrical machine MG.

(4) The above embodiment is described with respect to an example in which the second hydraulic control device 82 is positioned so as to partially overlap the first clutch C1 as viewed in the radial direction of the first clutch C1. However, embodiments of the vehicle drive device are not limited to this. The second hydraulic control device 82 may be placed at a differential position from the first clutch C1 in the axial direction of the first clutch C1 so as not to partially overlap the first clutch C1 as viewed in the radial direction of the first clutch C1. The above embodiment is described with respect to an example in which the vehicle drive device 1 includes the first clutch C1. However, the vehicle drive device 1 may not include the first clutch C1, and the input shaft I and the rotating electrical machine MG may be drivingly coupled to each other so as to constantly rotate cooperatively (e.g., rotate together). Alternatively, the vehicle drive device 1 may not include the first clutch C1 and the input shaft I, and the vehicle drive device 1 may use only the torque of the rotating electrical machine MG to move the vehicle.

(5) The above embodiment is described with respect to an example in which the case 3 can be divided into the first case portion 3a that forms the rotating electrical machine accommodating space SG, and the second case portion 3b that forms the speed change mechanism accommodating space SM. However, embodiments of the vehicle drive device are not limited to this. The case 3 may be divided at any position as appropriate.

(6) The above embodiment is described with respect to an example in which oil supplied from the second hydraulic control device 82 to the circulating oil pressure chamber H2 of the first clutch C1 is supplied to the rotating electrical machine MG after being discharged from the circulating oil pressure chamber H2. However, embodiments of the vehicle drive device are not limited to this. The oil pressure controlled by the first hydraulic control device 81 or the second hydraulic control device 82 may be supplied to the rotating electrical machine MG via an oil passage provided separately from the second oil passage A2, without flowing through the first clutch C1. In this case, no oil pressure may be supplied to the circulating oil pressure chamber H2 of the first clutch C1, and the oil pressure controlled by the second hydraulic control device 82 may be supplied only to the hydraulic oil pressure chamber H1 of the first clutch C1.

(7) The above embodiment is described with respect to an example in which the oil pressure controlled by the first hydraulic control valve 41 of the second hydraulic control device 82 is directly supplied to the hydraulic oil pressure chamber H1 of the first clutch C1. However, embodiments of the vehicle drive device are not limited to this. The vehicle drive device 1 may include a hydraulic control valve (not shown) in addition to the first hydraulic control valve 41, so that the oil pressure controlled (regulated) by this hydraulic control valve is supplied to the hydraulic oil pressure chamber H1 of the first clutch C1. In this case, it is preferable that this hydraulic control valve be used as a pressure regulating valve that is operated by using the oil pressure controlled by the first hydraulic control valve 41 as a signal pressure to regulate a line pressure, and this hydraulic control valve be provided in the second hydraulic control device 82.

(8) The above embodiment is described with respect to an example in which the first accommodating space S1 accommodating the first hydraulic control device 81 is a space surrounded by the second case portion 3b and the first oil pan 11 attached to the lower part of the second case portion 3b. However, embodiments of the vehicle drive device are not limited to this. The first accommodating space S1 may be formed only by a part of the case 3 which is integral with the second case portion 3b (e.g., may be formed in the peripheral wall of the second case portion 3b).

(9) The above embodiment is described with respect to an example in which the second accommodating space S2 accommodating the second hydraulic control device 82 is a space surrounded by the first case portion 3a and the second oil pan 12 attached to the lower part of the first case portion 3a. However, embodiments of the vehicle drive device are not limited to this. The second accommodating space S2 may be formed only by a part of the case 3 which is integral with the first case portion 3a (e.g., may be formed in the peripheral wall of the first case portion 3a).

(10) The above embodiment is described with respect to an example in which the vehicle drive device 1 includes the torque converter TC having a torque amplifying function as a fluid coupling. However, embodiments of the vehicle drive device are not limited to this. The vehicle drive device 1 may include a fluid coupling having no torque amplifying function instead of the torque converter TC.

(11) In the above embodiment, the second oil pan 12 is attached so as to be tilted downward with respect to the axis X from its first side L1 in the axial direction toward its second side L2 in the axial direction. However, embodiments of the vehicle drive device are not limited to this. For example, the second oil pan 12 may be attached parallel to the axis X without being tilted toward its second side L2 in the axial direction.

(12) In the above embodiment, the second accommodating space S2 is shifted to the second side L2 in the axial direction with respect to the rotating electrical machine MG. However, embodiments of the vehicle drive device are not limited to this. For example, the second accommodating space S2 may be positioned so as to overlap the entire rotating electrical machine MG in the axial direction.

(13) Regarding other configurations as well, the embodiments disclosed in the specification are merely examples in all respects, and embodiments of the vehicle drive device are not limited to this. That is, those configurations which are not described in the claims of the present application may be modified as appropriate without departing from the object of the present disclosure.

5. Summary of Embodiment

The outline of the above vehicle drive device will be described below.

A vehicle drive device (1) includes: a rotating electrical machine (MG); a speed change mechanism (TM) disposed in a power transmission path connecting the rotating electrical machine (MG) and wheels (W); a fluid coupling (TC) that drivingly couples the rotating electrical machine (MG) to the speed change mechanism (TM); a case (3) forming, as spaces that are independent of each other, a rotating electrical machine accommodating space (SG) accommodating the rotating electrical machine (MG), a speed change mechanism accommodating space (SM) accommodating the speed change mechanism (TM), and a fluid coupling accommodating space (SC) accommodating the fluid coupling (TC); a first oil reservoir portion (U1) that communicates with the speed change mechanism accommodating space (SM) and that can store oil; a hydraulic pump (9) that supplies the oil in the first oil reservoir portion (U1) to the rotating electrical machine (MG) and the speed change mechanism (TM); a second oil reservoir portion (U2) that is located in the rotating electrical machine accommodating space (SG) and that can store oil; and a discharge oil passage (AD) that discharges the oil in the second oil reservoir portion (U2) to the first oil reservoir portion (U1), wherein the fluid coupling accommodating space (SC) is formed between the rotating electrical machine accommodating space (SG) and the speed change mechanism accommodating space (SM) in an axial direction of the speed change mechanism (TM) and is configured such that no oil is supplied to a region around the fluid coupling (TC), the discharge oil passage (AD) has an introducing opening (ADi) that opens to the second oil reservoir portion (U2), and a lowest end of the introducing opening (ADi) is located below a lowest end (MGu) of the rotating electrical machine (MG).

That is, oil is supplied to the rotating electrical machine accommodating space (SG) and the speed change mechanism accommodating space (SM), and no oil is supplied to the region around the fluid coupling (TC) in the fluid coupling accommodating space (SC) formed between the rotating electrical machine accommodating space (SG) and the speed change mechanism accommodating space (SM) in the axial direction. According to the above configuration, even if the spaces to which oil is supplied are separated from each other in the axial direction by the space to which no oil is supplied, oil in the first oil reservoir portion (U1) can be supplied to the rotating electrical machine (MG) by the hydraulic pump (9). Oil can thus be appropriately supplied to the rotating electrical machine (MG), and rotation resistance of the rotor (Ro) can be reduced as compared to the case where oil is scooped up by rotation of the rotor (Ro) and supplied to the rotating electrical machine (MG). The vehicle drive device (1) includes the second oil reservoir portion (U2) located in the rotating electrical machine accommodating space (SG) and the discharge oil passage (AD) that discharges oil in the second oil reservoir portion (U2) to the first oil reservoir portion (U1). Accordingly, oil supplied to the rotating electrical machine (MG) can be collected in the second oil reservoir portion (U2), and the oil collected in the second oil reservoir portion (U2) can be supplied to the first oil reservoir portion (U1) via the discharge oil passage (AD). That is, an oil flow path is formed through which oil supplied to the rotating electrical machine (MG) by the hydraulic pump (9) is collected in the first oil reservoir portion (U1) from which oil is sucked by the hydraulic pump (9).

According to the above configuration, the lowest end of the introducing opening (ADi) of the discharge oil passage (AD) which opens to the second oil reservoir portion (U2) is located below the lowest end (MGu) of the rotating electrical machine (MG). Accordingly, oil dropping from above and stored in the second oil reservoir portion (U2) can be introduced into the discharge oil passage (AD) through the introducing opening (ADi) located at a lower position. This restrains a part of the oil from staying in the second oil reservoir portion (U2), and oil can be appropriately circulated. This can restrain reduction in efficiency of cooling the rotating electrical machine (MG) due to oil staying in the second oil reservoir portion (U2).

It is preferable that the rotating electrical machine (MG) include a stator (St) fixed to the case (3) and a rotor (Ro) placed on a radially inner side of the stator (St), the discharge oil passage (AD) have a discharge opening (ADo)

that opens to the first oil reservoir portion (U1), and a lowest end (AHo) of the discharge opening (ADo) be located below a lowest end (Rou) of the rotor (Ro).

According to this configuration, the oil level in the second oil reservoir portion (U2) when the vehicle is not subjected to an inertial force can be restrained from becoming higher than the lowest end (Rou) of the rotor (Ro). This can restrain oil in the second oil reservoir portion (U2) from being scooped up when the rotor (Ro) rotates, and can thus reduce rotation resistance of the rotor (Ro).

It is preferable that the vehicle drive device (1) further include: an input member (I) that is drivingly coupled to an internal combustion engine; a friction engagement device (C1) that is placed on a radially inner side (R1) of the rotating electrical machine (MG) and that selectively couples the input member (I) to the rotating electrical machine (MG); and a hydraulic control device (82) including a hydraulic control valve (41, 42, 43) that controls an oil pressure to be supplied to the friction engagement device (C1), and the hydraulic control device (82) be placed in the discharge oil passage (AD).

According to this configuration, oil that is discharged when the hydraulic control valve (82) controls the oil pressure (reduces the oil pressure) can be discharged to the discharge oil passage (AD). Not only oil supplied from the second oil reservoir portion (U2) to the discharge oil passage (AD) but also oil discharged to the discharge oil passage (AD) by the hydraulic control valve (82) can thus be returned to the first oil reservoir portion (U1) via the discharge oil passage (AD).

INDUSTRIAL APPLICABILITY

The technique according to the present disclosure can be preferably used for a vehicle drive device including: a rotating electrical machine; a speed change mechanism disposed in a power transmission path connecting the rotating electrical machine and wheels; a fluid coupling that drivingly couples the rotating electrical machine to the speed change mechanism; and a case forming, as spaces that are independent of each other, a rotating electrical machine accommodating space accommodating the rotating electrical machine, a speed change mechanism accommodating space accommodating the speed change mechanism, and a fluid coupling accommodating space accommodating the fluid coupling.

The invention claimed is:
1. A vehicle drive device, comprising:
a rotating electrical machine;
a speed change mechanism disposed in a power transmission path connecting the rotating electrical machine and wheels;
a fluid coupling that drivingly couples the rotating electrical machine to the speed change mechanism;
a case forming, as spaces that are independent of each other, a rotating electrical machine accommodating space accommodating the rotating electrical machine, a speed change mechanism accommodating space accommodating the speed change mechanism, and a fluid coupling accommodating space accommodating the fluid coupling;
a first oil reservoir that communicates with the speed change mechanism accommodating space and that can store oil;
a hydraulic pump that supplies the oil in the first oil reservoir to the rotating electrical machine and the speed change mechanism;
a second oil reservoir that is located in the rotating electrical machine accommodating space and that can store oil;
a discharge oil passage that discharges the oil in the second oil reservoir to the first oil reservoir;
an input that is drivingly coupled to an internal combustion engine;
a friction engagement device that is placed on a radially inner side of the rotating electrical machine and that selectively couples the input to the rotating electrical machine; and
a hydraulic control including a hydraulic control valve that controls an oil pressure to be supplied to the friction engagement device, wherein
the fluid coupling accommodating space is formed between the rotating electrical machine accommodating space and the speed change mechanism accommodating space in an axial direction of the speed change mechanism and is configured such that no oil is supplied to a region around the fluid coupling,
the discharge oil passage has an introducing opening that opens to the second oil reservoir,
a lowest end of the introducing opening is located below a lowest end of the rotating electrical machine, and
the hydraulic control is placed in the discharge oil passage.

2. The vehicle drive device according to claim 1, wherein
the rotating electrical machine includes a stator fixed to the case and a rotor placed on a radially inner side of the stator,
the discharge oil passage has a discharge opening that opens to the first oil reservoir, and
a lowest end of the discharge opening is located below a lowest end of the rotor.

* * * * *